Patented Nov. 9, 1937

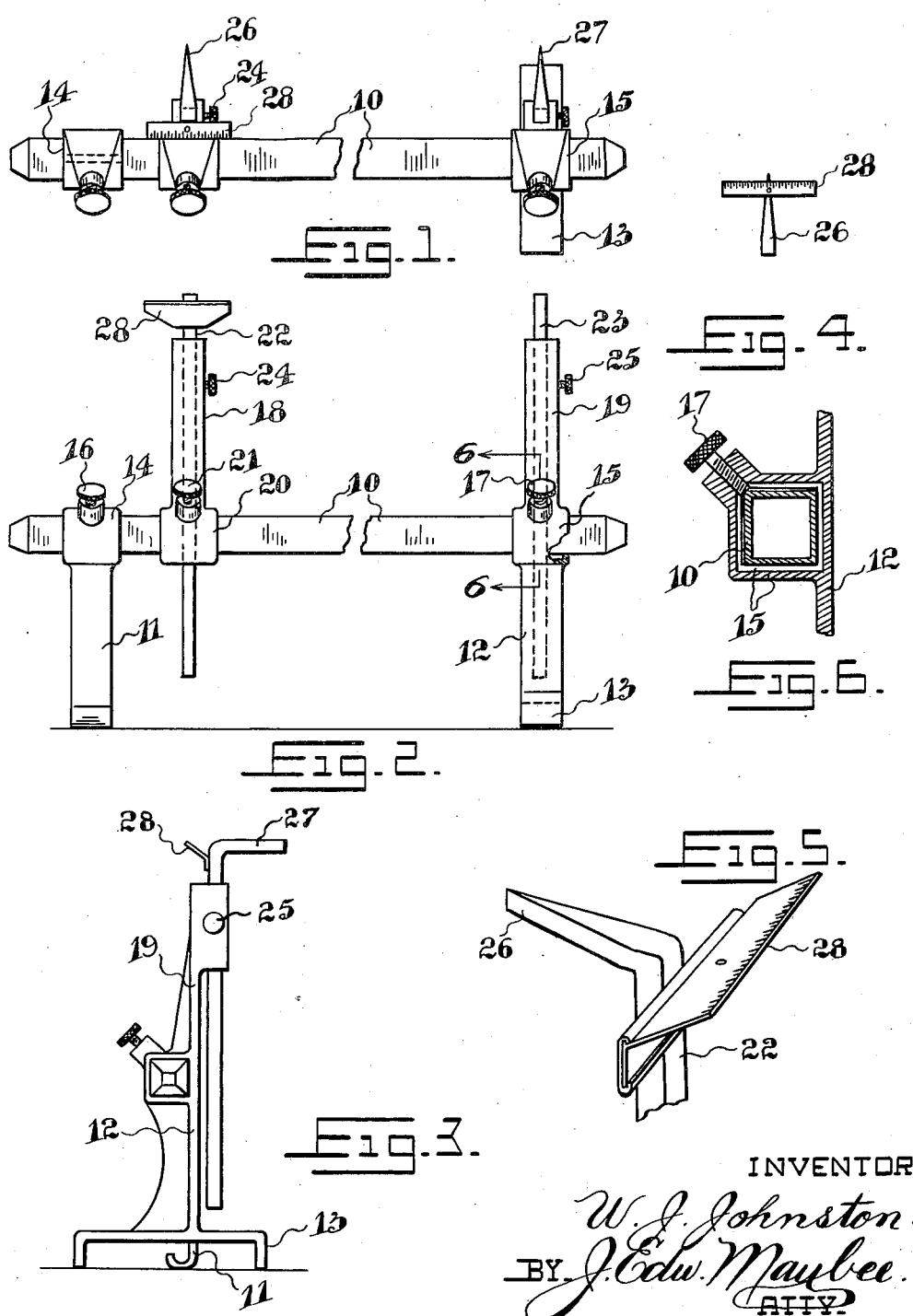

2,098,749

UNITED STATES PATENT OFFICE 2,098,749

GAUGE FOR MEASURING THE ALIGNMENT OF VEHICLE WHEELS

William James Johnston, London, Ontario, Canada, assignor to Albert Speare Lashbrook, London, Ontario, Canada Application October 29, 1936, Serial No. 108,129

13 Claims. (Cl. 33—203)

This invention relates to gauge for measuring the alignment of vehicle wheels, and more particularly gauges of the type in which a line is inscribed on the periphery of each wheel by markers and the variation of the position of the line at the front and back of the wheels is measured to determine the amount of toe-in or toe-out.

The object of my invention is to avoid the inaccuracies of known measuring devices of this type and to reduce the possibility of errors in making readings.

I achieve my object by mounting a scale so that it may be read directly from the inscribed line without the necessity of moving the marker after it has once been set.

My invention is hereinafter more particularly described and is illustrated in the accompanying drawing in which—

Fig. 1 is a plan view of the gauge;

Fig. 2 a front view;

Fig. 3 an end view;

Fig. 4 a plan view of a modified form of marker showing the scale mounted on the pointer;

Fig. 5 a fragmentary perspective view on an enlarged scale of a modified form of marker showing the scale slidably mounted on the marker; and Fig. 6 a fragmentary vertical cross section on the line 6—6 in Fig. 2.

Corresponding numbers in the various views refer to corresponding parts.

A substantially square bar 10 extends between two vertical supports 11 and 12. The support 12 is provided with a foot or base 13, and the bar 10 is slidably mounted in chamber cored castings or collars 14 and 15 respectively on the supports 11 and 12, provided with set screws 16 and 17 which extend diagonally through the collars 14 and 15 respectively and engage a corner of the bar 10. The edges of the openings through the collars 14 and 15 are slightly raised to provide bearings upon which the bar rests as illustrated in Fig. 6. This provides a very solid mounting for the bar preventing relative movement between the bar and the supports 11 and 12 which might cause inaccuracies in the readings.

Markers 22 and 23 are mounted on the bar 10 by means of upright members 18 and 19 respectively. Preferably as shown in the drawing, the upright member 19 is integral with or connected with the support 12. The upright supporting member 18 is slidably mounted on the bar 10 by means of a collar 20 having a set screw 21. The collar and set screw are constructed and arranged in the same manner as the collars 14 and 15 and the set screws 16 and 17 previously described.

The markers 22 and 23 are vertically slidable in longitudinal slots in the upright supports 18 and 19 and may be maintained in the desired position by means of set screws 24 and 25.

The upper end of each marker extends at right angles thereto to form pointers or inscribers 26 and 27 respectively. Mounted on the side of the marker 22 by any suitable means opposite to the pointer 26 is a scale 28 calibrated on either side of the center thereof, the center being marked "zero", the calibrations on either side indicating the amount of toe-in or toe-out of the wheel as hereinafter described.

The device is used as follows. The wheels of the car the alignment of which is to be measured are jacked up and the periphery of the tire is chalked. The gauge is then arranged on one side either at the front or back of the wheel with the pointers or inscribers 26 and 27 engaging the tire approximately midway between the sides thereof and at a point in the horizontal plane of the axle. The wheels are then rotated so that the pointers or inscribers 26 and 27 will inscribe lines around the periphery in the median plane of the wheel. The wheels are then lowered to the ground or floor. When this has been done the marker 22 is removed from its support 18 by loosening the set screw 24 and is reversed so that the calibrated edge of the scale 28 is presented to the line on the tire. The pointer 27 is set to the inscribed line on one wheel and the scale is adjusted so that the zero point will be immediately opposite the line on the other wheel. This may be done by loosening the set screw 21 and moving the support 18 on the bar 10. When the zero point is immediately opposite the line the set screw 21 is screwed down to prevent any further relative movement between the support 18 and the bar 10. The whole device is then moved around to the other side of the tire and the pointer 27 is arranged so that it touches or is immediately opposite the line on one of the tires. The line on the other tire will if there is any toe-in or toe-out not be opposite the zero point but to one side or other thereof. The operator takes the reading of the point on the scale immediately opposite the line on the tire and this gives him the amount of toe-in or toe-out according to which side of the zero point the reading is.

In Fig. 4 I show the scale mounted on the pointer 26 near its inscribing point whereby readings can be taken without reversing the marker as described above.

In Fig. 5 I show the scale slidably mounted on a guide member 30 on the marker 22. With this construction the scale may be positioned after the line has been inscribed without moving the marker 22 on the bar 10.

This gives a very accurate reading, because after the lines have been made and the markers initially adjusted no further adjustment or movement of the markers is necessary in order to take the reading. The actual indicia on the scale gives the exact amount of toe-in and toe-out without any calculation being necessary. The method of mounting the bar and the markers as previously described practically eliminates any relative movement thereof which would affect the reading.

While a specific method of mounting the scale and positioning it is described, it is obvious that the scale might be mounted in other ways and might be otherwise adjustable to present it to the inscribed lines for the purpose of the initial setting without departing from my invention in its broadest aspect.

What I claim as my invention is:

1. A gauge for measuring the alignment of the wheels of a vehicle, comprising spaced apart markers each adapted to inscribe a line on the periphery of one of the wheels; a scale mounted on the reverse side of one of the markers; and means for reversing the position of the marker to present the scale to the inscribed line.

2. A gauge for measuring the alignment of the wheels of a vehicle, comprising spaced apart markers each adapted to inscribe a line on the periphery of one of the wheels; a scale mounted on the reverse side of one of the markers; means for reversing the position of the marker to present the scale to the inscribed line; and means for adjusting the position of the marker on which the scale is mounted relative to the other marker, whereby the scale may be moved and set in its initial position with a predetermined number, for example zero, opposite the inscribed line.

3. A gauge for measuring the alignment of the wheels of a vehicle, comprising spaced apart markers each having a pointer extending substantially at right angles thereto and adapted to inscribe a line on the periphery of one of the wheels; a transverse bar on which the markers are mounted, one of them slidably; a scale mounted on the reverse side of one of the markers opposite the pointer; and means for reversing the position of the marker to present the scale to the inscribed line.

4. A gauge for measuring the alignment of the wheels of a vehicle, comprising markers adapted to inscribe a line on the periphery of the wheels; a scale associated with one of the markers upon which the position of the line may be noted; and means for vertically adjusting the markers.

5. A gauge for measuring the alignment of the wheels of a vehicle, provided with spaced markers each formed with a scribing point adapted to mark a line on the periphery of a wheel in its median plane; a scale; and means for supporting the scale on one of the markers with its calibrations adjacent the inscribed line at or near the position occupied by the scribing point of one of said markers when marking said line, whereby readings of the spacing of said lines may be taken directly on the scale.

6. A gauge for measuring the alignment of the wheels of a vehicle, provided with spaced markers each formed with a scribing point adapted to mark a line on the periphery of a wheel in its median plane; a scale; and means for positioning the scale with its calibrations adjacent the inscribed line at or near the position occupied by the scribing point of one of said markers when marking said line, whereby readings of the spacing of said lines may be taken directly on the scale.

7. A gauge for measuring the alignment of the wheels of a vehicle, provided with spaced markers each formed with a scribing point adapted to mark a line on the periphery of a wheel in its median plane; a scale mounted on one of the markers; and means for positioning the scale with its calibrations adjacent the inscribed line at or near the position occupied by the scribing point of one of said markers when marking said line, whereby readings of the spacing of said lines may be taken directly on the scale.

8. A gauge for measuring the alignment of the wheels of a vehicle, provided with spaced markers each formed with a scribing point adapted to mark a line on the periphery of a wheel in its median plane; a scale mounted on one of the markers; means for positioning the scale with its calibrations adjacent the inscribed line at or near the position occupied by the scribing point of one of said markers when marking said line, whereby readings of the spacing of said lines may be taken directly on the scale; and means for adjusting the position of the scale to bring a predetermined calibration, for example zero, opposite the inscribed line.

9. A gauge for measuring the alignment of the wheels of a vehicle, provided with spaced markers each formed with a scribing point adapted to mark a line on the periphery of a wheel in its median plane; a scale mounted on one of the markers; means for positioning the scale with its calibrations adjacent the inscribed line at or near the position occupied by the scribing point of one of said markers when marking said line, whereby readings of the spacing of said lines may be taken directly on the scale; and means for adjusting the relative position of the markers to bring the scribing point of one marker opposite one of the inscribed lines and a predetermined calibration on the scale, for example zero, opposite to the other inscribed line.

10. A gauge for measuring the alignment of the wheels of a vehicle, provided with spaced markers each formed with a scribing point adapted to mark a line on the periphery of a wheel in its median plane; and a scale fixed to one of the markers, said scale extending transversely of the marker adjacent the scribing point with the said scribing point projecting slightly beyond the scale, whereby readings of the spacing of the inscribed lines may be taken directly on the scale.

11. A gauge for measuring the alignment of the wheels of a vehicle, comprising spaced apart markers each formed with a scribing adapted to inscribe a line on the periphery of one of the wheels; a transverse bar between the markers on which one of the markers is slidably mounted; a scale mounted on the slidable marker; and means for positioning the scale with its calibrations adjacent one of the lines at or near the position occupied by the scribing point of the marker on which the scale is mounted when marking said line whereby readings of the spacing of said lines may be taken directly on the scale.

12. A gauge for measuring the alignment of the wheels of a vehicle, comprising spaced apart markers each adapted to inscribe a line on the periphery of one of the wheels; a scale mounted on the reverse side of one of the markers; means for reversing the position of the marker to present the scale to the inscribed line; and means for adjusting the position of scale relative to the other marker, whereby the scale may be moved and set in its initial position with a predetermined number, for example zero, opposite the inscribed line.

13. A gauge for measuring the alignment of the wheels of a vehicle, provided with spaced markers each formed with a scribing point adapted to mark a line on the periphery of a wheel in its median plane; a guide member mounted on one of the markers; a scale slidably mounted in the guide member; and means for positioning the scale with its calibrations adjacent the inscribed line at or near the position occupied by the scribing point of one of said markers when marking said line, whereby readings of the spacing of said lines may be taken directly on the scale.

WILLIAM JAMES JOHNSTON.